(12) United States Patent
Lee et al.

(10) Patent No.: US 8,909,009 B2
(45) Date of Patent: Dec. 9, 2014

(54) LIGHT GUIDES HAVING ENHANCED LIGHT EXTRACTION

(75) Inventors: Tzu-Chen Lee, Woodbury, MN (US); David A. Ender, New Richmond, WI (US); Guoping Mao, Woodbury, MN (US); Jun-Ying Zhang, Woodbury, MN (US); Jaime B. Willoughby, Hugo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 573 days.

(21) Appl. No.: 13/139,600

(22) PCT Filed: Dec. 8, 2009

(86) PCT No.: PCT/US2009/067067
§ 371 (c)(1),
(2), (4) Date: Jun. 14, 2011

(87) PCT Pub. No.: WO2010/080289
PCT Pub. Date: Jul. 15, 2010

(65) Prior Publication Data
US 2011/0243500 A1    Oct. 6, 2011

Related U.S. Application Data

(60) Provisional application No. 61/138,649, filed on Dec. 18, 2008.

(51) Int. Cl.
| | |
|---|---|
| *G02B 6/26* | (2006.01) |
| *G02B 6/10* | (2006.01) |
| *G02B 6/34* | (2006.01) |
| *F21V 8/00* | (2006.01) |
| *G02F 1/1335* | (2006.01) |

(52) U.S. Cl.
CPC ............ *G02B 6/0036* (2013.01); *G02B 6/0065* (2013.01); *G02B 6/0061* (2013.01); *G02F 1/133615* (2013.01)
USPC ................... 385/31; 385/27; 385/39; 385/46; 385/50; 385/129; 385/132

(58) Field of Classification Search
CPC ........... G02B 6/12009; G02B 6/12011; G02B 6/12019; H01S 5/0268
USPC ..................... 385/27, 37, 39, 46, 50, 129–132
See application file for complete search history.

(56) References Cited

U.S. PATENT DOCUMENTS

| | | | |
|---|---|---|---|
| 5,896,119 A | 4/1999 | Evanicky | |
| 6,158,867 A | 12/2000 | Parker | |

(Continued)

FOREIGN PATENT DOCUMENTS

| | | |
|---|---|---|
| EP | 1331495 A1 | 7/2003 |
| JP | 2001-281654 A | 10/2001 |

(Continued)

OTHER PUBLICATIONS

Gosalvez, "Anisotropic wet chemical etching of crystalline silicon: atomistic Monte-Carlo simulations and experiments", Applied Surface Science, Mar. 2001, vol. 178, No. 104, pp. 7-26.

(Continued)

*Primary Examiner* — Akm Ullah
*Assistant Examiner* — Michael Mooney
(74) *Attorney, Agent, or Firm* — Yufeng Dong; Kristofor L. Storvick; Daniel J. Iden

(57) ABSTRACT

Lightguides, devices incorporating lightguides, processes for making lightguides, and tools used to make lightguides are described. A lightguide includes light extractors arranged in a plurality of regions on a surface of the lightguide. The orientation of light extractors in each region is arranged to enhance uniformity and brightness across a surface of the lightguide and to provide enhanced defect hiding. The efficiency of the light extractors is controlled by the angle of a given light extractor face with respect to a light source illuminating the light guide.

6 Claims, 10 Drawing Sheets

(56) References Cited

U.S. PATENT DOCUMENTS

| | | |
|---|---|---|
| 6,522,373 B1 | 2/2003 | Hira et al. |
| 6,712,481 B2 * | 3/2004 | Ezell et al. ............ 362/619 |
| 2006/0260921 A1 | 11/2006 | Lee |
| 2007/0013663 A1 | 1/2007 | Park |
| 2007/0035843 A1 | 2/2007 | Cassarly |
| 2007/0057031 A1 | 3/2007 | Lee |
| 2007/0153549 A1 | 7/2007 | Parker |
| 2008/0205841 A1 * | 8/2008 | Hwang et al. ............ 385/129 |

FOREIGN PATENT DOCUMENTS

| | | |
|---|---|---|
| JP | 2004-226863 | 8/2004 |
| JP | 2005-043717 | 2/2005 |
| JP | 2008-041295 | 2/2008 |
| JP | 2008-235141 A | 10/2008 |
| KR | 10-2006-0109371 | 10/2006 |
| KR | 10-2008-0006311 | 1/2008 |
| WO | WO 2006-109921 | 10/2006 |
| WO | WO 2007-137102 | 11/2007 |
| WO | WO 2010-080289 | 7/2010 |

OTHER PUBLICATIONS

Micro-Needles for Drug Delivery, Vaccines, and Medical Diagnostics, Yet2.com, tow0039236.pdf, Dec. 10, 2006, one page.

Werkmeister, "Anisotropic Etching of Silicon as a Tool for Creating Injection Molding Tooling Surfaces". Journal of Microelectromechanical Systems, Dec. 2006, vol. 15, No. 6, pp. 1671-1680.

Werkmeister, "Development of Silicon Insert Molded Plastic (SIMP)." EME Thesis. Massachusetts Institute of Technology, Cambridge MA, May 6, 2005, 101 pages.

Willoughby, "Elastically Average Precision Alignment". Doctorate ME Thesis. Massachusetts Institute of Technology, Cambridge MA, Jun. 2005, pp. 1-158.

International Search Report for PCT/2009/067067, 4 pages, mailed on Jul. 20, 2010.

U.S. Appl. No. 60/967623, entitled "Lightguides Having Light Extraction Structures Providing Regional Control of Light Output", filed Sep. 6, 2007.

* cited by examiner

LIGHT GUIDES HAVING ENHANCED LIGHT EXTRACTION

CROSS REFERENCE TO RELATED APPLICATIONS

This application is a national stage filing under 35 U.S.C. 371 of PCT/US2009/067067, filed on Dec. 8, 2009, which claims priority to U.S. Provisional Application No. 61/138,649, filed on Dec. 18, 2008, the disclosure of which is incorporated by reference in its/their entirety herein.

TECHNICAL FIELD

The present invention is related to lightguides, devices incorporating lightguides, tools for making lightguides and other structures, and processes for making lightguides and lightguide-making tools.

BACKGROUND

Many electronic devices use backlights to provide illumination for displays and other components. Backlights commonly use a lightguide that transmits from a light source along an extent of the backlight. It is desirable for the backlight to provide substantially uniform brightness and high light extraction in the viewing areas with few observable defects. To soften or mask non-uniformities in brightness and other defects, a light scattering element, such as a diffuser, may be used. However, such scattering elements typically direct light away from a preferred viewing axis and require higher power output to achieve the same level of brightness.

The efficient use of light to illuminate keypads and displays is particularly important in battery powered portable devices because illumination of the device consumes a relatively large percentage of the device power budget. Light extractors have been used to extract light from lightguides and to enhance the uniformity of the lightguide brightness.

There is a need for lightguides that can enhance illumination, reduce observable defects, and/or reduce power requirements of a variety of devices. There is also a need for efficient tools for creating such lightguides. The present invention fulfills these and other needs, and offers other advantages over the prior art.

SUMMARY

One embodiment of the invention involves a tool for making a backlight. The tool includes a plurality of regions. Each region of the tool includes an array of prisms. Each prism has a first base edge that generally faces a front edge of the tool. The first base edge of a prism in a first region are not parallel to the first base edge of a prism in a second region.

Another embodiment of the invention is directed to a lightguide. The lightguide includes an array of discrete region. Each discrete region includes a plurality of polyhedron light extractors. The light extractors in each region all have a base edge that is most proximate to a light input location. Each base edge generally faces a light input location.

Yet another embodiment of the invention involves a backlight that includes a light source and a lightguide. The lightguide includes a plurality of regions. Each of the plurality of regions of the lightguide includes a plurality of light extracting prisms. The light extracting prisms of each prism all possess one edge generally facing a light source. Light extracting prisms in different regions are oriented in different directions.

A further embodiment of the invention is directed to a cell phone backlight that includes an LED and a keypad lightguide corresponding to cell phone keys. The lightguide is configured such that each cell phone key corresponds to an array of light extraction elements on the lightguide. The light extraction elements of a first array each have a rectangular base with a front edge oriented at a first angle such that the base edge faces the LED for producing maximum light extraction. The light extraction elements of a second array each have a rectangular base with a front edge oriented at a second angle such that the base edge faces the LED for producing maximum light extraction. The first and second angles are different.

Another embodiment of the invention is directed to a method for fabricating a lightguide tool. The method involves etching a number of pyramidal structures into a first region of a substrate. The structures are etched such that the base of each structure within the first region is oriented at a first angle with respect to a front edge of the lightguide tool. The method further involves etching a number of pyramidal structures into a second region of a substrate. The structures are etched such that the base of each structure within the second region is oriented at a second angle with respect to a front edge of the lightguide tool different from the first angle from the first region.

DESCRIPTION OF THE DRAWINGS

The same reference numeral used in multiple figures refers to the same or similar elements having the same or similar properties and functionalities.

Figure 1:
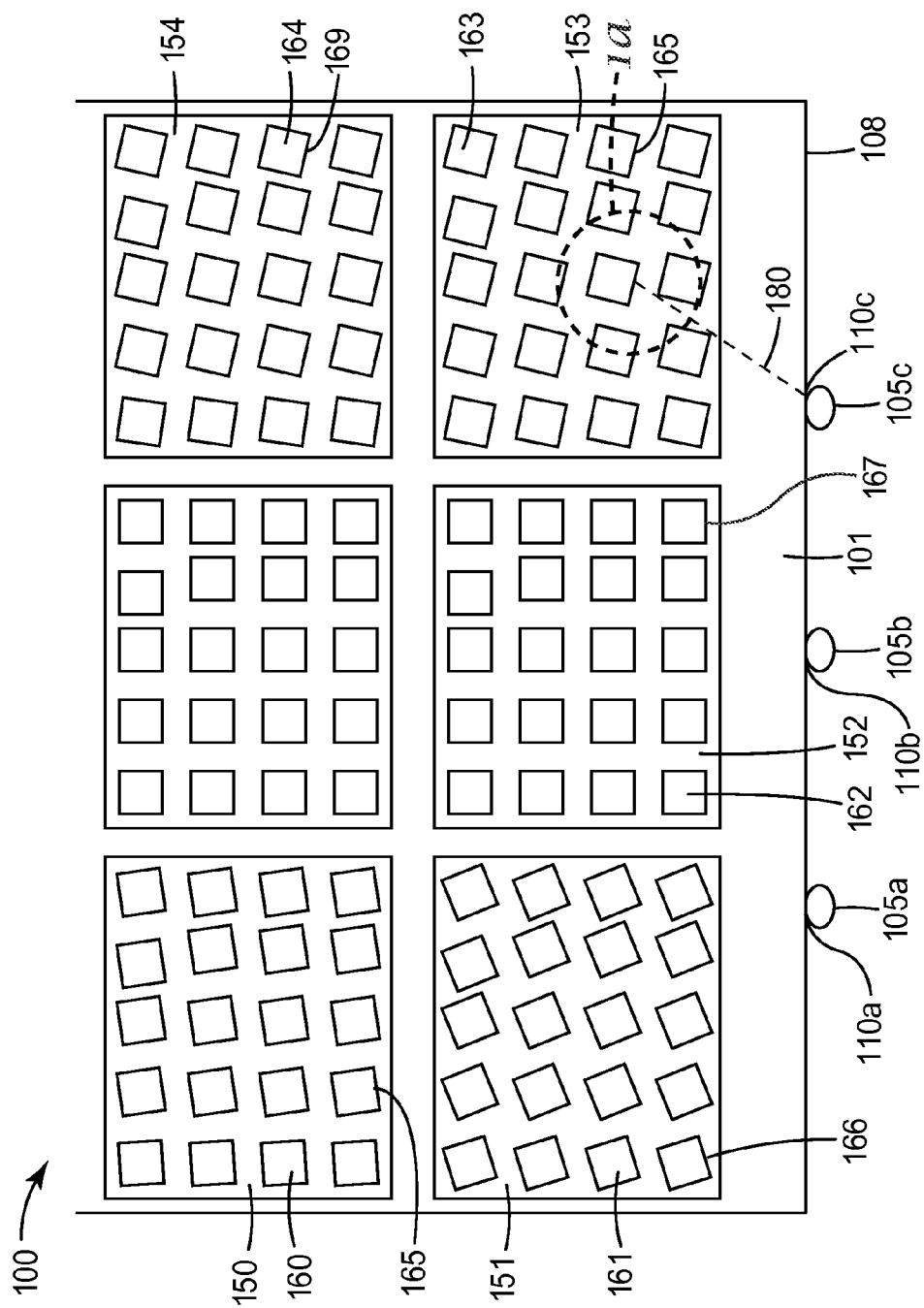
FIG. 1 is a top-down view of a lightguide.

While the invention is amenable to various modifications and alternative forms, specifics thereof have been shown by way of examples in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description of the illustrated embodiments, references are made to the accompanying drawings forming a part hereof, and in which are shown by way of illustration, various embodiments by which the invention may be practiced. It is to be understood that other embodiments may be utilized, and structural and functional changes may be made without departing from the scope of the present invention.

FIG. 1 is a top-down view of a lightguide assembly 100 including multiple light sources 105a, 105b and 105c arranged relative to a lightguide 101 at respective light input locatios 110a, 110b, and 110c. Edge-lit lightguides may be arranged with one or more light sources at one or more edges or corners of the lightguide. The light sources 105 may be light emitting diodes (LEDs), fluorescent lamps or other types of lamps. Light output from the light sources 105 may be lambertian or other shapes of light output. Light from the light source that is coupled into the receiving edge at a light input location is confined in the lightguide by total internal reflection (TIR) as the light propagates away from the light source toward a far edge of the lightguide. Any suitable number of light sources 105 and corresponding light input locations 110 may be used. For example, rather than using three light sources 105 and light input locations 110, the lightguide may be coupled to only one light source 105. In some cases, there may be one or more light sources along one edge of the lightguide and one or more light sources along a different edge of the lightguide.

Lightguides are frequently used in backlights that illuminate displays, such as liquid crystal displays (LCDs). In display applications, it is usually desirable to maintain a uniform light output from the lightguide over the continuous display surface. Lightguides may also be used to illuminate keypads, such as the keypad of a cellphone or other portable devices. In keypad applications, it is desirable for the light output to occur primarily in the regions corresponding to the keys because light output from other areas is wasted or provides less efficient illumination of the keypad. It is also typically desirable that the illumination of the keypad be uniform from key to key (no key visibly brighter than another) and within each key region. Lightguides may be made of any suitable number of materials. One such material may be a polymer blend.

The lightguide of the embodiment shown in FIG. 1 includes an array of discrete regions 150, 151, 152, 153, and 154. The lightguide regions 150-154 may be regularly or irregularly spaced. The regions may all be of one size, or may vary in size across the lightguide. It may be especially beneficial to position the regions of a lightguide to correspond to back-lit electronic keys, for which the lightguide may be used, where the regions may then be referred to as key regions.

Each of the discrete regions 150-154 comprises a plurality of light extractors 160, 161, 162, 163 and 164 respectively. Light extraction structures extract light from the lightguide and can be configured to enhance uniformity in light output across the surface of the lightguide. The light extractors 160, 161, 162, 163 and 164 of this embodiment are polyhedron shaped and are grouped into arrays corresponding to a given region. The light extractors described herein may be formed in a variety of sizes, geometric shapes, and surface profiles, including, for example, both protruding and recessed structures. The light extractor pattern in each region may be non-uniform with respect to areal density, where areal density may be determined by a number of extractors within a unit area or the size of extractors within a unit area.

Figure 2:
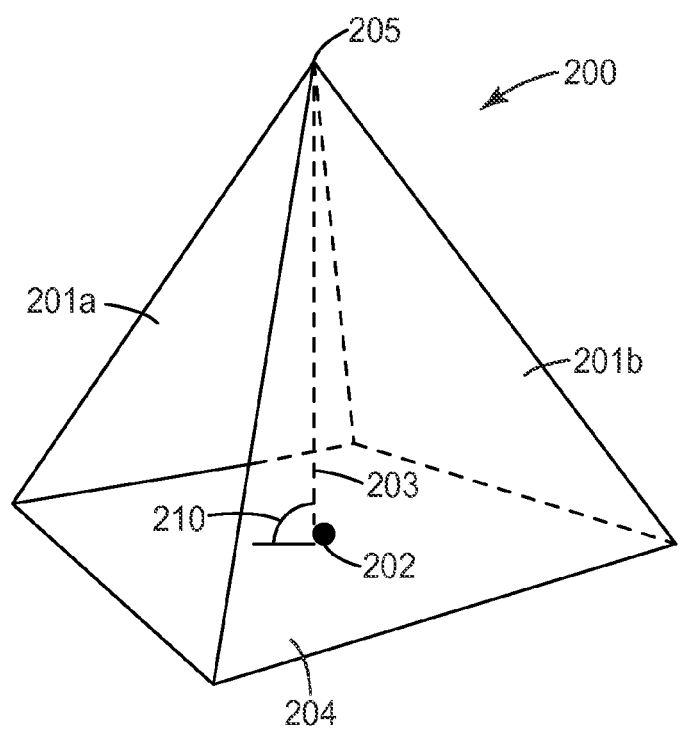
FIG. 2 illustrates a light extractor.

One suitable shape for the light extractors is a pyramid. Such an extractor is illustrated in FIG. 2. A pyramidal light extractor may have any number of facets 201. Certain embodiments of the invention will have pyramidal light extractors with four facets, such as that shown in FIG. 2. Two of these facets are illustrated as facets 201a and 201b The light extractors may be formed so that variation in at least one shape factor, such as height and/or tilt angle 210, controls light extraction efficiency of the light extractor. Height of the extractor is the height along the principle axis 203 of the extractor from the center 202 of the extractor base 204 to the center of the extractor top or apex 205. Tilt angle 210 is the angle between the principle axis 203 and the base 204. It will be appreciated that different tilt angles will result in certain facets 201 of the extractor meeting the base 204 at different angles.

It will be appreciated in FIG. 1, that each light extractor has a base, in this embodiment, a rectangular base, that includes a base edge 165, 166, 167, 168 or 169 most proximate to a light input location 105. The base edge 165-169 is purposely oriented such that it generally faces a light input location 105. By selectively angling the extractor base orientation, a region such as 154 will possess light extractors 164 that extract more light, resulting in greater light output and therefore greater light uniformity across the lightguide.

Figure 1A:
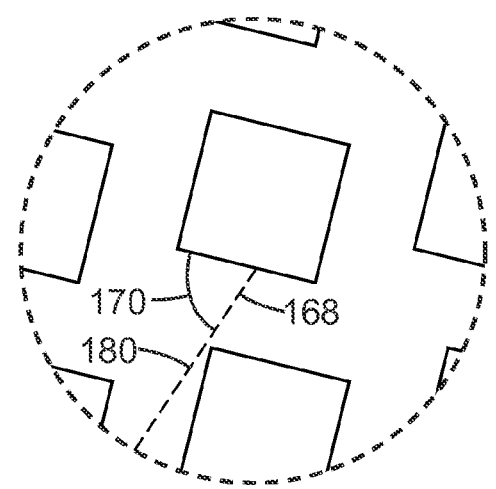
FIG. 1a is a close-up view of a portion of a lightguide.

It will be appreciated that given the different position of light extractor regions 151, 152 and 153 with respect to light sources 105a, 105b and 105c the extractors in one region may generally face a different closest light input location. For example, the extractors 161 in a first region 151 may generally face a first light input location 110a. The extractors 162 in a second region 152 may generally face a second light input location 110b. Similarly, the extractors 163 in a third region 153 may generally face a third light input location 110c. It will therefore be appreciated that the base edge 166 of a first region 151, base edge 167 of a second region 152, and base edges 168 of a third region 153 all are non-parallel. The orienting of light extraction features by region allows for more uniform extraction across the lightguide. This may be better understood by the close-up view illustrated in FIG. 1a. The efficiency of the light extractors is controlled by the angle, e.g. 170, of a given light extractor base edge 168 with respect to a line 180 extending from a corresponding light input location e.g. 110c to the extractor, e.g. 163. Desirably, the base edge 165-169 will be close to normal to a line from the light input location 110 and the light extractor. A desirable angle of the base edge with respect to this line will be 90°±10°, more preferably 90°±5°, more preferably 90°±3° and even more preferably 90°±1°.

The assembly 100 of FIG. 1 may be a backlight extractor, and more particularly a cell phone backlight extractor.

Figure 3:
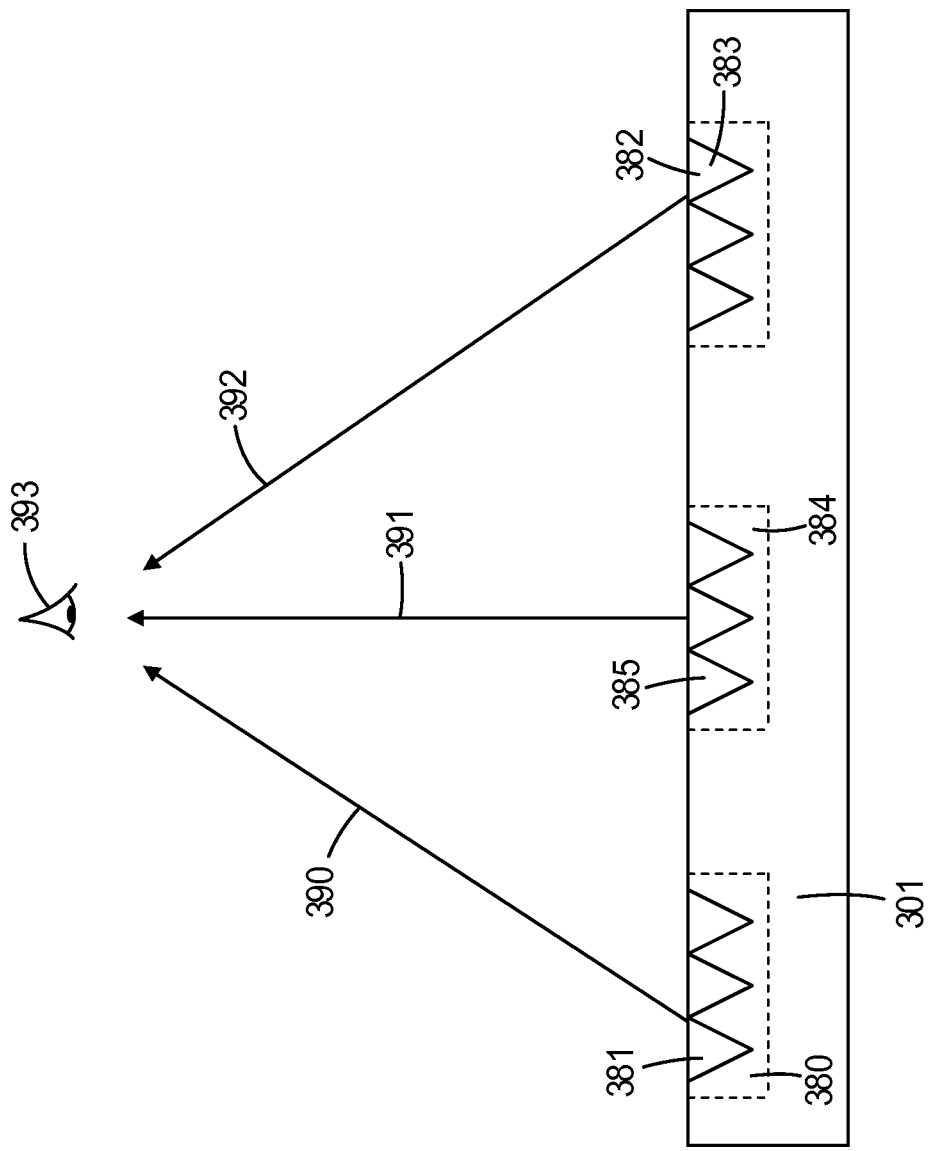
FIG. 3 is a side view of a lightguide.

FIG. 3 is a side view of a lightguide 301 illustrating the regions of the lightguide (e.g. 380, 384, 382) and light activity. Light enters the lightguide 301 in this model going into the page. Each extractor has a base edge that faces a corresponding light source. Furthermore, the extractor is so designed that the extracted light propagates to a desired location, such as viewer 393. If the light extractors are correctly oriented by base edge and facet angle, their varying lateral position by region 380, 384 and 382 will not result in a great nonuniformity in the extracted light. Because the extractor faces are optimally aligned, light interacting with extractors 381, 385 and 383 should be extracted as exiting light at higher luminance than if the base edges were not selectively aligned. Each region is brighter because of optimal alignment of the light extractors in the region. Therefore light 390, 391 and 392 should all reach viewer 393 at closer to equal luminance, resulting in what appears to the viewer 393 as a uniform display.

Figure 4:
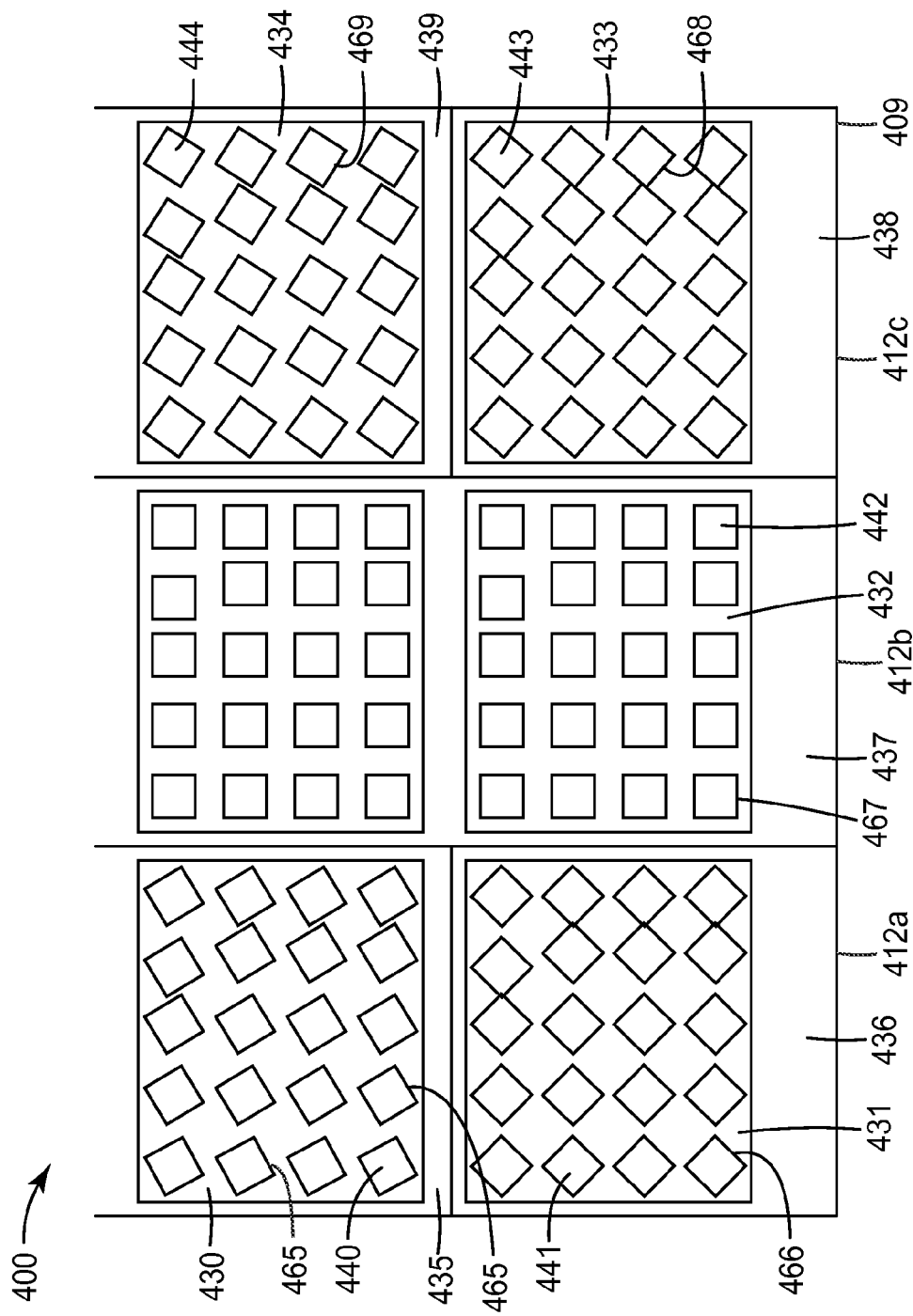
FIG. 4 is a top-down view of one lightguide-making tool.

FIG. 4 is an illustration of a tool 400 for making a lightguide. The lightguide tool may be comprised of any suitable number of materials, e.g. silicon. The tool, in the same manner as the lightguide of FIG. 1, is made up of a plurality of regions, 430, 431, 432, 433, 434. Each region 430-434 of the tool includes an array of prisms, e.g. 440, 441, 442, 443, 444. The tool of FIG. 4 may be used as a master for producing a number of lightguides and/or lightguide molds. Therefore, it will be appreciated that the prisms 440 of the tool 400 correspond to the inverse equivalent of the extractors in a lightguide. As with the lightguide regions, the plurality of tool regions 430-434 may correspond in orientation to keys on an electronic device, such as a cell phone. In the same manner then, each prism will have a base edge 465-469 that is most proximate to or faces the front edge 409 of the tool, specifically facing a point 412a, 412b or 412c. Because the tool is used to produce a lightguide, similar to that embodied in FIG. 1, the prisms must be oriented in order to eventually create correctly oriented light extractors. Therefore, the first base edge 466 of a prism 441 in a first region 431 will be non-parallel to the first base edge 467 of a prism 442 within a second region 432. Further the first base edge 468 of a prism 443 in a third region 433 will be non-parallel to a first base edge 466 of a prism 441 within a first region 431 and non-parallel to a first base edge 467 of a prism 442 within a second region 432. In this embodiment, the base edge 465-469 are oriented all to face a central point 412b.

Because the prisms of the tool 400 are used to create lightguides with extractors that are oriented in such a manner that they have enhanced light output, they too will be oriented with respect to points 412a-c on the front edge 409 of the tool, where points correspond generally to light input locations of a lightguide. In a tool used to create a lightguide with one light source, therefore, a first base edge 466 of a prism 441 within a first region 431 will be approximately orthogonal to a line extending from the center of region 431 to a first point on the front edge of the tool 412b. A first base edge 467 of a prism 442 within a second region 432 will then be approximately orthogonal to a line extending from the center of region 432 to the same first point on the front edge of the tool 412b.

Hypothetically (though not shown with accurate angles), for a tool used to create a lightguide with multiple light sources, a first base edge 466 of a prism 441 within a first region 431 will be approximately orthogonal to a line extending from the center of region 431 to a first point on the front edge of the tool 412a. However, the first base edge 467 of a prism 442 within a second region 432 will now be approximately orthogonal to a line extending from the center of region 432 to a second point on the front edge of the tool 412b (which would now correspond to a second light input location), different from the first point which the extractor base 466 generally faces. Similarly, the first base edge 468 of a prism 443 within a third region 433 will be approximately orthogonal to a line extending from the center of region 433 to a third point on the front edge of the tool 412c. These base edges should be optimally angled to form a lightguide with enhanced light extraction.

The prisms 440 of lightguide tool 400 may be any variety of sizes, geometric shapes, and surface profiles, including, for example, both protruding and recessed structures. Recessed structures may be preferred due to their greater ability to extract more light, their robustness and their more accommodating geometry than the protruding counterparts for devices such as cell phone keypads. The prism pattern in each region may be non-uniform with respect to areal density, where areal density may be determined by a number of prisms within a unit area or the size of prisms within a unit area. Other variations in prism shape factor, such as height and/or tilt angle (as explained earlier) may be chosen to create lightguide with the optimal light extraction.

The tool prisms may be any suitable number of shapes. In fact, the shape generally corresponds to the inverse of a chosen shape for light extractors in a lightguide to be produced. At least one of the prisms may be truncated. One suitable shape for the prism extractors is a pyramid. A pyramidal prism may have any number of facets. Certain embodiments of the invention will have tool pyramids with four facets. In an embodiment in which the tool 400 for making a lightguide is made of some sort of crystalline material such as silicon, the facets of the pyramid may be formed at an angle corresponding to the crystalline structure of the material. For example, in returning to FIG. 2, facets 210 and 210b may correspond to a given crystalline plane, while base 204 may lie in a different crystalline plane.

Figure 5A:
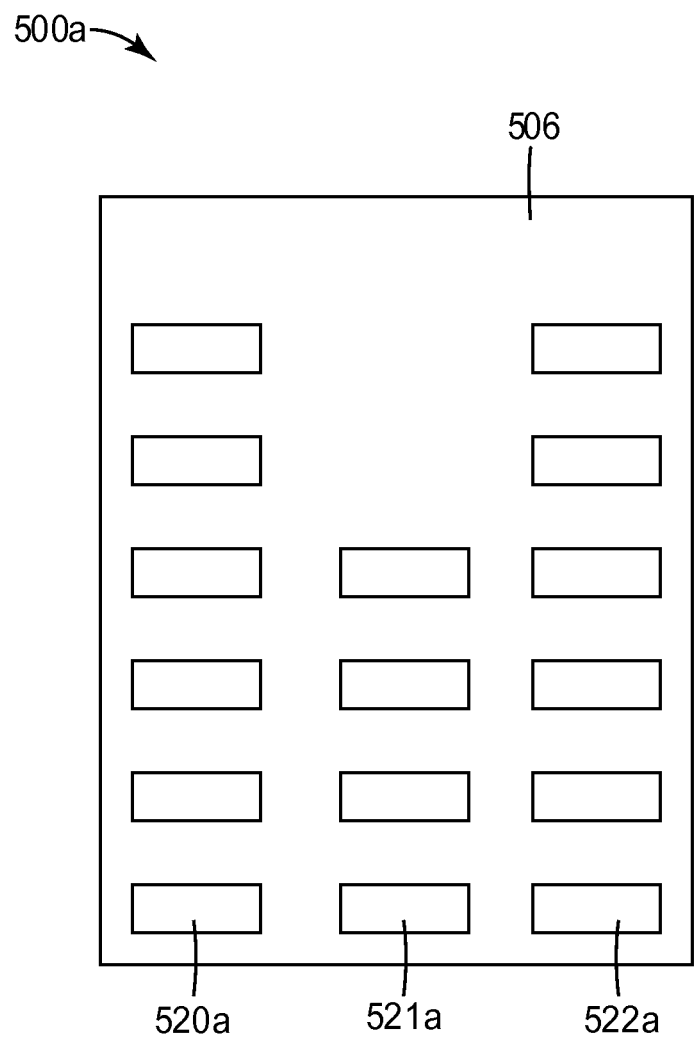
FIGS. 5a-5c illustrate various assemblies for tools used in making lightguides.
Figure 5B:
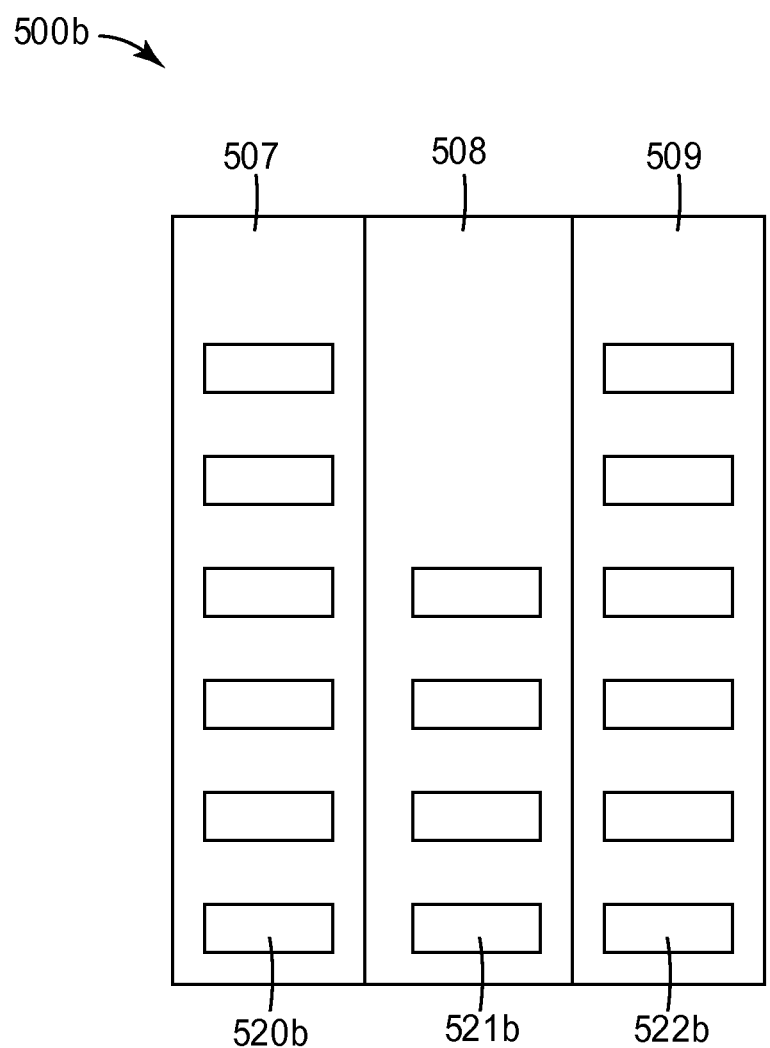
Figure 5C:
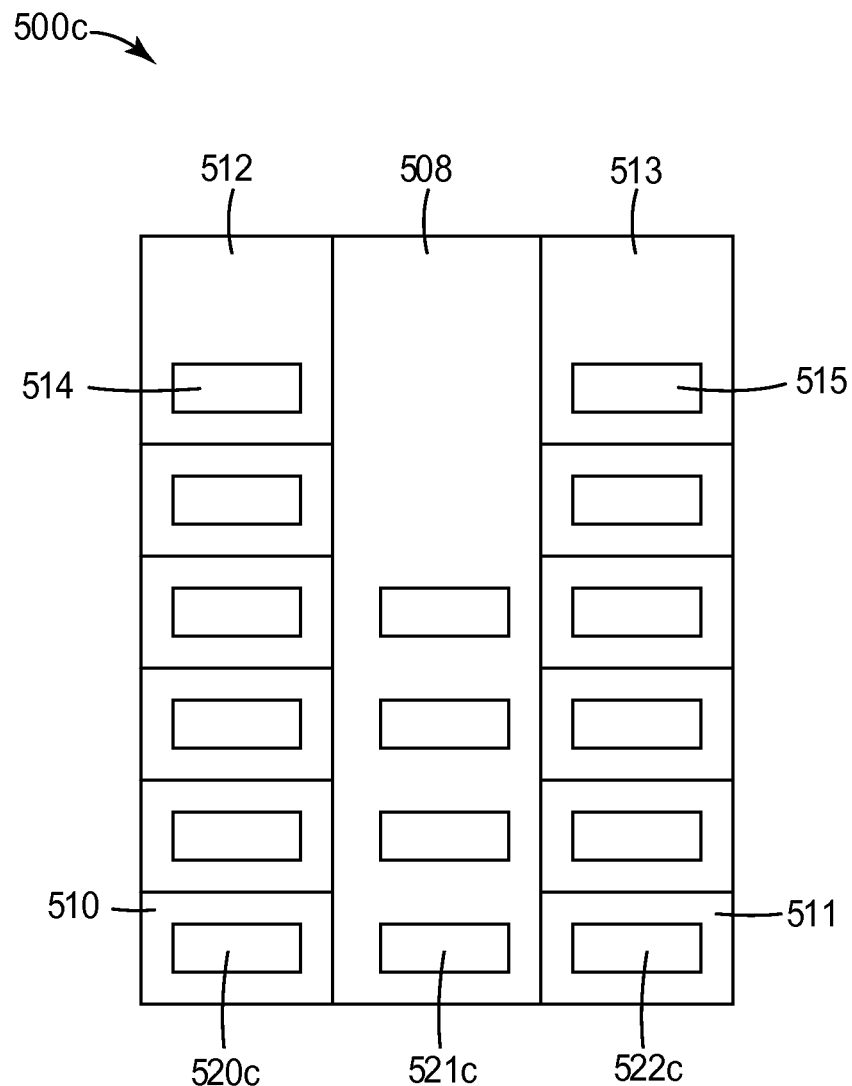

The embodiment in FIG. 4 corresponds to that illustrated in FIG. 5c. The embodiment is one which illustrates the use of multiple wafers. The wafers may be joined into one common substrate by means of tiling the wafers together. Tiling may be achieved in any number of ways including using an adhesive. For example, region 433 is found on slab 438. This wafer is oriented such that, in this case assuming a single light source waveguide will be created, the extractors 443 of region 433 face in a direction nearly normal to light that will enter a region of the lightguide corresponding to region 433. Slab 439 while also oriented for angled extractor edges, shows extractors 444 with lesser angles than the extractors 443. The same sort of relationship applies to slabs 436 and 435 with their respective extractors 441 and 440. Because region 432 falls on-axis with what will correspond to the light's principal axis, the extractors on slab 437, require no selective angles. Therefore multiple regions, including region 432 may be located on one slab without losing performance. This may be better understood by looking to FIGS. 5a-5c.

FIGS. 5a-5c illustrate various assemblies for tools used in making lightguides. FIG. 5a is a view of a first embodiment in which the tool 500a is made up of one common wafer or substrate 506. The wafer may be made up of any number of suitable materials, including, for example silicon. Crystalline structures may be especially desirable given their suitability for simplified etching processes. Regions 520a, 521a, and 522a are regions into which light extractor masters will be formed from a common wafer. FIG. 5b illustrates an embodiment in which the tool is made up of three wafer slabs 507, 508 and 509 adhered to one another on, for example, a common substrate. In this embodiment, it is shown that first region 520b is formed on slab 507, second region 521b is formed on slab 508, and third region 522b is formed on slab 509. The setup for FIG. 5b may be desirable given a potential crystalline structure used in etching extractor molds into the tool. As will be discussed later, a crystalline structure such as silicon, may be easily etched according to a given "flat" of the structure. A flat is a planar layer inherently positioned and angled according to the crystalline structure. The flat provides the direction for a base edge of the extractor formed into the tool. Therefore, it may be desirable to form extractors in the regions that face three different directions. This selective angling will result in heightened uniformity and extraction across the lightguide.

FIG. 5c provides another example of a tool made up of multiple wafer slabs, e.g. 508, 510, 511, 512, and 513. It will be appreciated that regions 521c and the other regions located within slab 508 do not require multiple slabs as all of the regions fall on what will be the on-axis portion of the created lightguide. However, regions 520c and 522c may be placed on slabs 510 and 511 that are angled dramatically for heightened extraction and uniformity. Further, regions 514 and 515 may be placed on slabs 512 and 513 respectively, where the slabs require less angling and regions can be more optimally tuned for light extraction.

When using a crystalline material, the etched wafer will most likely result in inverted pyramidal structures. This is because certain etching methods will result in etching corresponding to the wafer's crystalline structure. Thus, the pyramids facets will correspond to the structure's crystalline planes. For example, when using silicon, the inverted extractor molds will be pyramidal and will be four-faceted.

Tools for making a lightguide may be produced in a number of ways. One particularly useful method for fabricating a lightguide tool involves etching inverted pyramidal structures into the substrate which makes up the tool. The etching may occur through a number of steps. The first step may involve etching the pyramidal structures into a first region of the substrate. The second step may involve etching a number of pyramidal structures into a second region of the substrate. The third step may involve etching a number of pyramidal structures into a third region of the substrate. More than one region of the substrate may be etched in one step.

The structures should be etched in the three regions such that the base of a structure within the first region is oriented at a first angle with respect to a front edge of the lightguide tool, and the base of a structure within the second region is oriented at a second angle with respect to the front edge of the lightguide tool which is different from the first angle. The base of a structure within a third region should be oriented at a third angle with respect to the front edge of the lightguide tool which is different than both the first and second angle.

Figure 6:
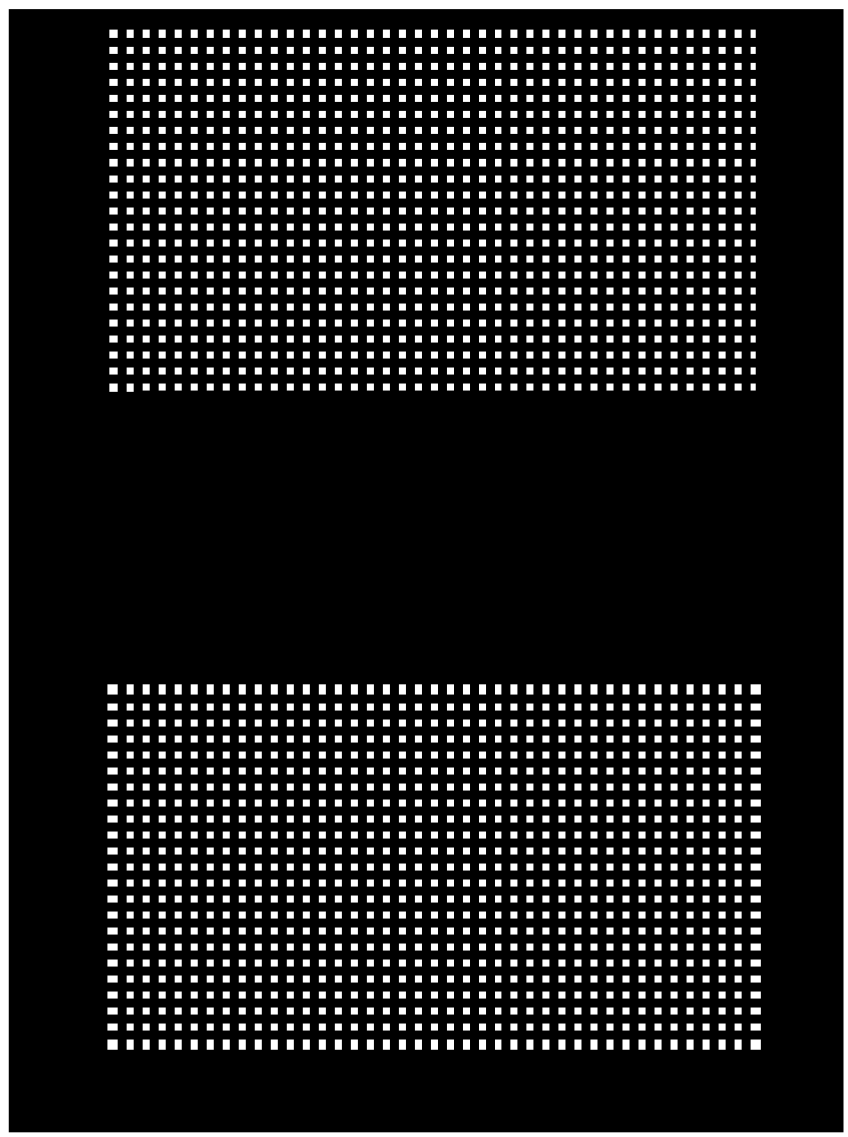
FIG. 6 illustrates a mask used to etch regions of a lightguide-making tool.

The tool substrate may be composed of any number of suitable materials. Particularly suitable substrates may be materials with crystalline structures. One such material is silicon. Patterning into the substrate may be accomplished by any number of suitable methods, including a standard lithography or other optical lithography, two-photon, diamond turning, skip burn EDM, dry etching and wet etching, e.g. anisotropic wet etching. One example of a wet etching process may involve depositing an etching mask layer, e.g. a metalloid nitride such as Silicon Nitride ($Si_3N_4$), on top of a Silicon wafer, followed by a polymer resist. A photomask may then be applied to on top of the resist layer. An example of such a photomask is shown in FIG. 6. Here the photomask 600 is applied to more than one region. The photomask selectively masks certain areas on the resist. The resists is then developed by means of a commercial resist developer resulting in pattern in the resist. Upon applying reactive ion beam to the masked slab, unmasked areas of the slab, now patterned will see the Silicon Nitride eroded away according to the pattern of the photomask. Areas that were previously masked will still have a layer of Silicon Nitride over the Silicon.

Figure 7:
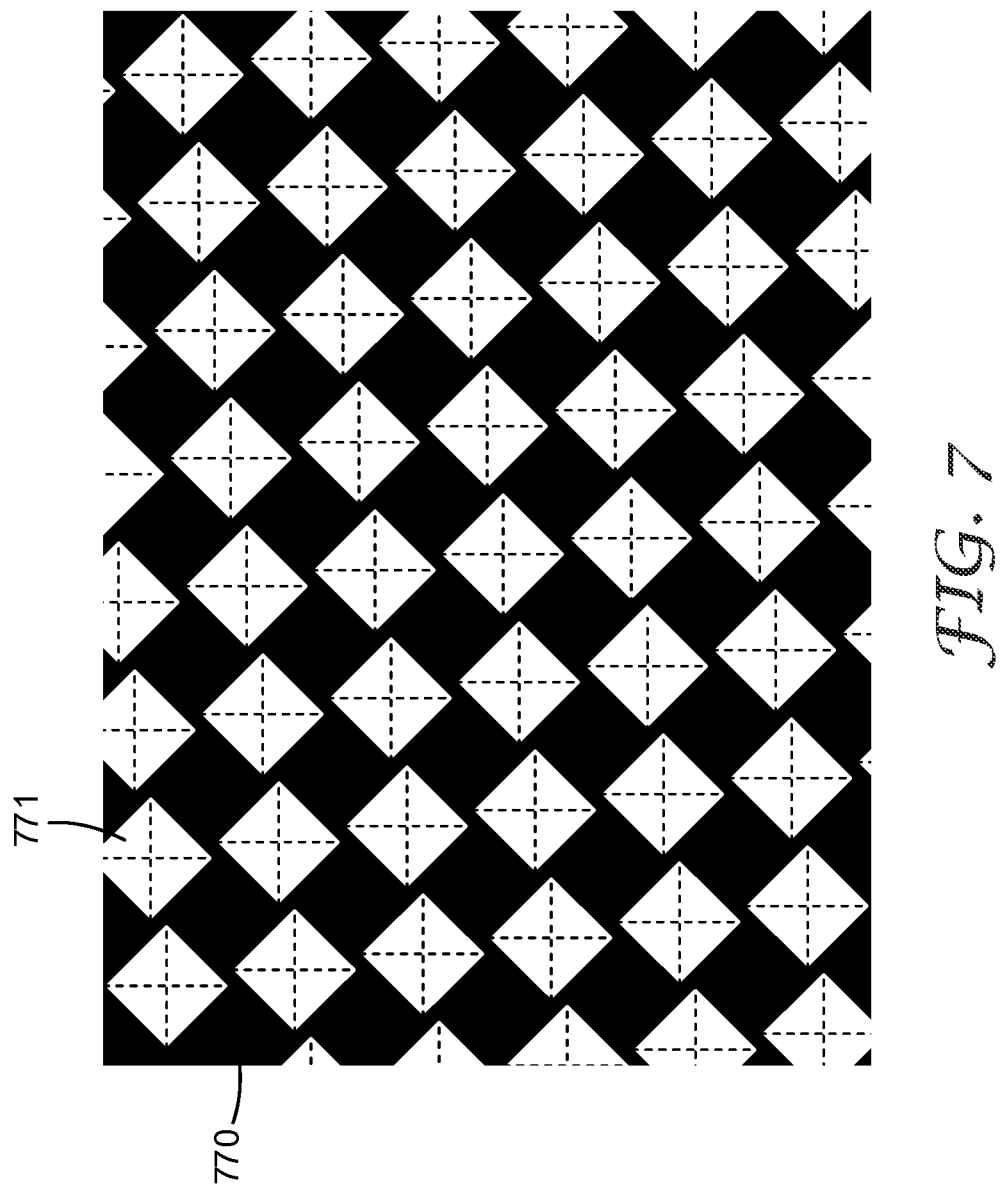
FIG. 7 illustrates a lightguide-making tool in the etching process.

Once the desired areas of the Silicon slab have been exposed, the slab may be exposed to an anisotropic chemical etchant. FIG. 7 provides an example of one potential etching result. Areas 770 that were previously masked will be protected from etching into the Silicon structure due to the remnants of the Silicon Nitride still protecting the face of the Silicon. Areas 771 will see the chemical etchant into the Silicon forming structures according to the crystalline geometry of the Silicon. In FIG. 7, the structure is shown to be an inverted pyramid. The manner of creation of these pyramids may be better understood by reference to FIG. 8.

Figure 8:
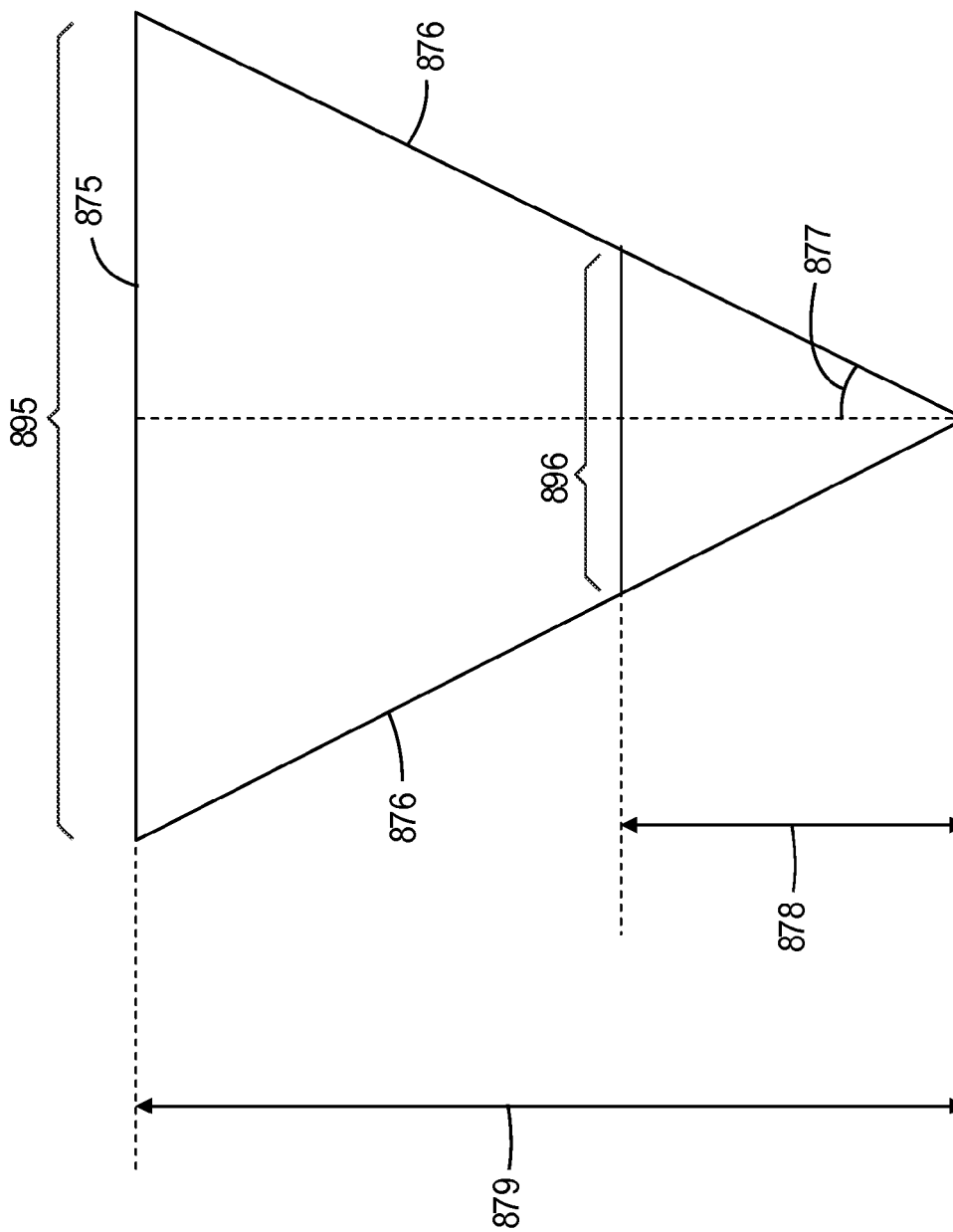
FIG. 8 is a cross-section view of a lightguide-making tool.

FIG. 8 is a cross-section view of a portion of a tool used to make a lightguide, here composed of a crystalline structure. As was previously stated, in this particular anisotropic etching process, the structure formation corresponds to the geometry of the material's crystalline structure. In FIG. 8, element 875 represents what is known as the (100) plane of the crystalline structure. Element 876 represents what is known as the (111) plane of the crystalline structure. The anisotropic chemical etchant in use has a faster etching rate for the (100) plane than the (111) plane. Therefore the etchant will result in pyramids with facets formed along the (111) plane 876. The crystalline structure in this example will result in an angle between the (111) planes of 70.52 degrees. Therefore the plane's angle 877 from normal to plane 875 will be equal to 35.26 degrees.

One can calculate the etched height 879 of the complete pyramid by measuring the width of the exposed region and the width of the partially etched pyramid. This is due to the geometric relation of the pyramid. Here the width of the exposure (or base of the pyramid) 895 may be called W. The width at the partially etched point 896 may be called W'. The height that remains to be etched 878 may be called H'. Due to the structure and known angles the following relationships hold true:

$$Tan(35.26°) = \frac{\frac{W}{2}}{H} = \frac{\frac{W'}{2}}{H'} = 0.707$$

$$EtchedHeight = H - H' = \left(\frac{W}{2} - \frac{W'}{2}\right) \bigg/ 0.707$$

It may also be particularly desirable to cease etching before the apex of the pyramid is formed. In other words it may be desirable to create a tool with a number of truncated pyramids, where the faceted structure further has a flat face at the top, or bottom, however viewed, of the pyramid. Providing truncated structures in a lightguide may result in more desirable light uniformity and output in the regions of the lightguide.

The pyramidal structures in different regions are oriented at different angles with respect to a front edge of the lightguide tool. In this particular process this may require that the substrate be comprised of a number of separate crystalline wafers tiled together. The tiling may occur after the etching occurs. Tiling may be achieved through a number of means, such as, by adhering the slabs together with adhesive on, for example, a common substrate. It will be appreciated that the multiplicity of wafers is used in order to selectively angle the crystalline material, in a manner such that the planes of the material are exposed and face the desired direction upon the completion of the tool.

If other processes for etching are used, a common wafer may be adequate in order to achieve the desired extractor tool angling. Therefore a common wafer may be used. Such processes may involve selectively angling the photomask and using a less concentrated etchant to interact with other planes of the crystalline material. Using a less concentrated etchant, e.g., a 10 wt. % KOH etchant with angled photomask may result polygonal structures angled with respect to the flat. Such structures may be formed according to different planes of the crystalline wafer than those described above, and may form a line, rather than point apex. Using the correct concentration chemical etchant may result in the angle of polygonal structure bases by up to 15 degrees away from the traditional flat of the wafer.

The result of any such process will be a tool for making a lightguide. The tools described herein may generally be referred to as masters. It will likely be desirable to create a number of daughter molds made of either metal or polymers. These replicated daughter molds will be less costly and can be disposed of after a desired number of uses. One particular polymer useful for creating a daughter mold or subsequent generations of molds is silicone. One particular metal useful for creating a daughter mold is Nickel, which is more robust than silicone mold, but requires longer time to make than a silicone replica. To form the Nickel mold, a metal seed layer may be placed on the lightguide tool. Nickel may then be electroformed on top of the metal seed layer resulting in formation of the Nickel mold. The mold may then be separated from the master by a number of means, including for example, delamination in an electrolyte solution. Lightguides may then be replicated by use of the daughter molds. Lightguides may be made of any number of suitable materials. A particularly suitable material may be some sort of polymer blend with proper viscosity for achieving high fidelity. Desirable optical clarity and mechanical properties are needed after lightguide parts are cured by ultraviolet light.

Other appropriate metal seed layers used may be composed of Silver (Ag), Aluminum (Al), Titanium (Ti), Nickel (Ni), Palladium (Pd), Chromium (Cr), Copper (Cu), and others.

The tool created by means of the process described may also be of particular use in a number of other applications. One such application is creating a tool for the creation of thermoplastic microneedle arrays. The precision-level of the etching process allows for creation of structures at the sub-micron level. After forming the desired silicon tool, a process of silicon insert mold plastic forming may ensue. Once a metal mold is created from the tool, the metal mold is interfaced with an injection molding machine and plastic parts are made. The resulting plastic parts may be either solid or hollow depending on the injection process. The base of the microneedle can range from 25 to 250 microns but is preferably less than 150 microns. The microneedles can range from 50 to 400 microns in height but are preferably less than 275 microns in height. The pitch between needles can range from 50 to 400 microns but is preferably less than 300 microns.

EXAMPLE

The following is one potential procedure for creating an embodiment of a lightguide tool according to the present invention.

A 4-inch diameter Silicon (100) wafer was used in the process. Both sides of the silicon wafer were coated with between 500 and 2000 angstroms of silicon nitride by low pressure vapour deposition (LPCVD) at a temperature between 500-1000° C.

Next, a standard lithography process was used to pattern the silicon nitride wafer. A negative resist (Futurrex NR7-1000P) was spun onto the wafer at a speed of 3000 rpm for 1 minute. Following the spin, the wafer was prebaked at 80° C. for 5 minutes on a hot plate. It was then exposed by a UV lamp with a total dose of about 240 mJ/cm$^2$. The first photo mask was placed on so that the edge of the keypad frame was parallel to the wafer flat. Post-exposure baking then was conducted at 130° C. for 6 minutes. Finally, the resist was developed in a commercially purchased RD6 for approximately 30 seconds to form patterns of circular arrays of holes on $Si_3N_4$/Si wafers.

$CF_4/O_2$ reactive ion etching (RIE) was then used to etch off $Si_3N_4$ holes. Other areas were still protected by the photoresist. The etching was conducted in a reaction ion etching system (e.g. Model PlasmaLab™ System100 available from Oxford Instruments, Yatton, UK) under the conditions shown in Table 1.

TABLE 1

Materials/Conditions used for Reactive Ion Etching

| Reactant/Condition: | Value: |
| --- | --- |
| C4F8 | 45 sccm |
| O2 | 5 sccm |

TABLE 1-continued

Materials/Conditions used for Reactive Ion Etching

| Reactant/Condition: | Value: |
| --- | --- |
| RF power | 80 W |
| Inductive Coupling Plasma (ICP) power | 1000 W |
| Pressure | 6 mTorr |

Next, an anisotropic KOH etchant was applied. A typical anisotropical etchant utilized was a mixture of KOH and water (10-50 wt % KOH in water, preferably 35%) at temperatures between 25-100° C., preferably at 80° C. The etchant was agitated in order to improve uniform etching rates over relatively large areas.

Silicon wafers have different chemical features in different directions due to the lattice structure, namely in the (100), (110), and (111) directions, it has increasingly denser atomic density. For an orientation-dependent etchant (e.g. 10-50 wt % KOH in water) the etch rate of (111) direction is much smaller than that (100) and (110) so that the silicon wafer in the (100) direction by the orientation-dependent etchant will result in v-shaped grooves.

Next, the Futurrex resist was removed by acetone. Afterwards, the wafer was cleaned by an active piranha etchant (a mixture of ~30 vol % of $H_2O_2$ in $H_2SO_4$) to get rid of any residues of resist. The wafer was then immersed in a heated KOH/$H_2O$ bath (~80° C.) for etching down to a desired depth. The depth was controlled by the etching time with an etching rate of ~1.55 μm/min.

After a while, due to the faster etching rate for the (100) plane than the (111) plane by this KOH/$H_2O$ etchant, together with undercutting, a square opening on the surface of the Silicon was formed. Based on the crystalline plane geometry, the angle spanned between of two (111) planes was 70.52°.

What is claimed is:

1. A lightguide, comprising:
   an array of discrete regions, each region comprising a plurality of polyhedron light extractors, each extractor in each region having a base edge most proximate to and generally facing a light input location at an edge of the lightguide,
   the array of discrete regions comprising a first region including a first group of polyhedron light extractors arranged in a two-dimensional array with rows and columns, and a second region including a second group of polyhedron light extractors arranged in a two-dimensional array with rows and columns, and
   the first group of polyhedron light extractors each having the respective base edges being oriented at a first angle with respect to the edge of the lightguide, the second group of polyhedron light extractors each having the respective base edges being oriented at a second angle with respect to the edge of the lightguide, the first angle being different from the second angle.

2. The lightguide of claim 1, comprising only one light input location.

3. The lightguide of claim 1, comprising multiple light input locations, wherein an extractor in a first region may generally face a first light input location, and an extractor in a second region may generally face a second light input location.

4. The lightguide of claim 1, wherein the lightguide is comprised of a polymer blend.

5. The lightguide of claim 1, wherein the array of discrete regions generally match keys of an electronic device, the first group of polyhedron light extractors is configured to illuminate a first key of the keys, and the second group of polyhedron light extractors is configured to illuminate a second key of the keys.

6. The lightguide of claim 1, wherein the first region is positioned on an axis corresponding to a principal axis of a light input at the light input location, and the second region is positioned off the axis.

\* \* \* \* \*